Sept. 29, 1925.  1,555,025
F. E. RAYMOND
VALVE
Filed July 21, 1923
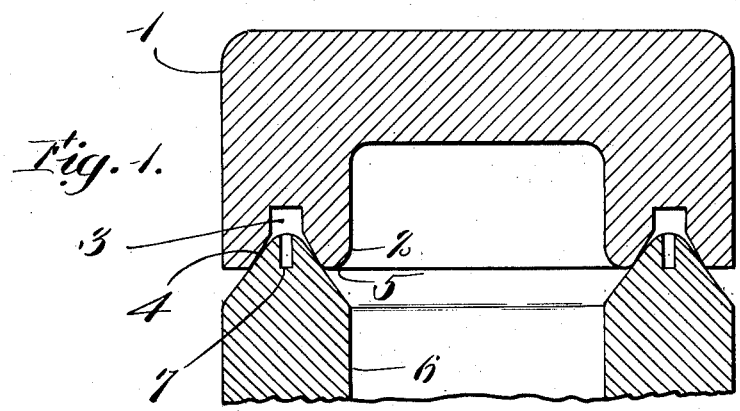
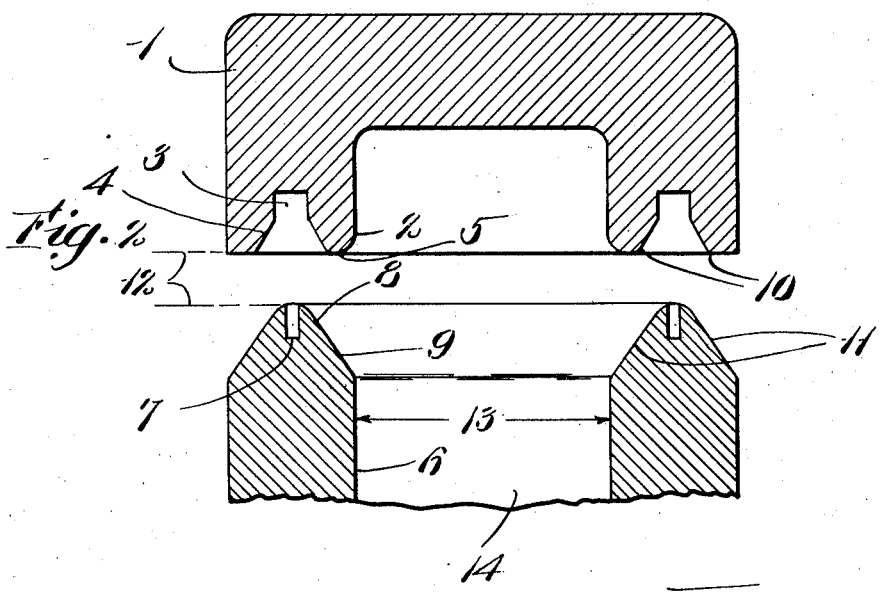

Patented Sept. 29, 1925.

1,555,025

UNITED STATES PATENT OFFICE.

FAIRFIELD E. RAYMOND, OF BOSTON, MASSACHUSETTS, ASSIGNOR TO CROSBY STEAM GAGE AND VALVE CO., OF BOSTON, MASSACHUSETTS, A CORPORATION OF MASSACHUSETTS.

VALVE.

Application filed July 21, 1923. Serial No. 652,930.

*To all whom it may concern:*

Be it known that I, FAIRFIELD E. RAYMOND, a citizen of the United States, residing at Boston, in the county of Suffolk and State of Massachusetts, have invented certain new and useful Improvements in Valves, of which the following is a specification.

This invention relates to globe valves, angle valves, cross valves and other valves of a similar character; and its object is to secure a valve in which provision is made for a more perfect flow of the fluid and a more perfect seating of the disc with the least wear upon the seating surfaces.

The invention is illustrated by the accompanying drawings in which: Figure 1 is a vertical, central, cross-sectional view of the disc seated; and Fig. 2 is a similar view of the disc raised from its seat.

The disc 1 is furnished with the peripherally disposed and downwardly projected annulus 2, which is furnished with the circumferential groove 3, the lower walls 4 of which are bevelled in opposite directions, the lower inner wall terminating in the curved portion 5 of the annulus 2.

The seat 6 comprises an annulus furnished with the circumferential groove 7, the top 8 of the seat being rounded and its exterior walls 9 being bevelled.

The disc and seat are so proportioned and relatively disposed that:—

The normal, lineal, annular seatings are at 10 near the lower resilient end of the bevelled portion 4 of the disc and at 11 midway of the less resilient bevelled portion of the seat.

The groove 3 is relatively deep and broad to produce a corresponding degree of resiliency in the disc and to firmly clasp or clutch the seat.

The groove 7 is comparatively shallow and narrow to produce a seat resilient at the top but affording a rigid support below the top not liable to be distorted as disc and seat are firmly forced together in closing.

The curved portion 5 of the disc and the curved portion 8 of the seat serve to secure a vena contacta, thereby causing the jet of fluid to pass directly over the seating surfaces without abrasion, as these surfaces are removed from the impact and flow of the fluid.

Disc 1 and seat 6 act in the direction of their common axis in opening and closing the passage between them.

The bevels of the disc and seat are of different angles, that of the disc being the lesser, so that the contacts between them, normally lineal, develop into zones of a width proportional to the excess of pressure exerted upon the disc over that beneath it, and all without shouldering or distortion.

By thus providing for a double seating (10 and 11) of the disc on the seat and furnishing the disc and seat with resilient grooves as described, a much better seating of the disc is obtained than would otherwise be possible.

Disc 1 in receding from seat 6 leaves a passage 12 between their nearest surfaces of a diameter greater than one quarter (¼) of the diameter 13 of the seat port 14.

I claim:—

1. In a valve of the character described a disc and a seat having a common vertical axis and furnished with bevelled seating surfaces and interior grooves in a plane perpendicular to the axis: the bevel of the disc being of lesser angle than that of the seat.

2. In a valve of the character described a disc and a seat having a common vertical axis; the disc being furnished with a downwardly projected, interiorly grooved and bevelled annulus; and the seat having a rounded, interiorly grooved top and being exteriorly bevelled; the diameter of the groove of the disc being greater than that of the groove of the seat; and the bevel of the disc being of lesser angle than that of the seat.

3. In a valve of the character described a disc and a seat having a common vertical axis; the disc being furnished with a downwardly projected, interiorly grooved and bevelled annulus curved at the bottom; and the seat having a rounded, interiorly grooved top and being exteriorly bevelled; the diameter of the groove of the disc being greater than that of the groove of the seat; and the bevel of the disc being of lesser angle than that of the seat.

4. In a valve of the character described a valve disc having a downwardly projected interiorly grooved and bevelled annulus, and a valve seat having a cooperating annular portion bevelled exteriorly at a greater angle than the bevel of the disc and having a circumferential groove formed in the top which is comparatively narrow and shallow in depth, the relative diameters of the contacting bevelled portions of the disc and seat being such that the lower edge of the disc engages with the bevelled portion of the seat adjacent the bottom portion of the annular groove.

FAIRFIELD E. RAYMOND.